United States Patent
Yoon et al.

(10) Patent No.: US 9,355,323 B2
(45) Date of Patent: May 31, 2016

(54) IMAGE CORRECTION METHOD AND APPARATUS FOR VISUALLY IMPAIRED PERSON

(71) Applicant: HIMS International Corp., Daejeon (KR)

(72) Inventors: Yang Taik Yoon, Daejeon (KR); Kyeong Seon Choi, Daejeon (KR); Sang Jun Lee, Daejeon (KR); Il Hyung Kim, Daejeon (KR); Young Guk Ryu, Daejeon (KR)

(73) Assignee: JAWON MEDICAL CO., LTD, Daejeon (KR)

( * ) Notice: Subject to any disclaimer, the term of this patent is extended or adjusted under 35 U.S.C. 154(b) by 170 days.

(21) Appl. No.: 14/263,045

(22) Filed: Apr. 28, 2014

(65) Prior Publication Data
US 2015/0109487 A1 Apr. 23, 2015

(30) Foreign Application Priority Data
Oct. 18, 2013 (KR) .......................... 10-2013-0124306

(51) Int. Cl.
*G06K 9/18* (2006.01)
*G06K 9/32* (2006.01)
*G06T 3/00* (2006.01)
*G06T 5/00* (2006.01)

(52) U.S. Cl.
CPC ................ *G06K 9/18* (2013.01); *G06K 9/3275* (2013.01); *G06T 3/00* (2013.01); *G06T 5/006* (2013.01)

(58) Field of Classification Search
CPC ... H04N 5/357; H04N 5/772; H04N 1/00718; G06K 9/3275; G06K 9/18; G06T 3/00; G06T 5/006
See application file for complete search history.

(56) References Cited

U.S. PATENT DOCUMENTS

| | | | | |
|---|---|---|---|---|
| 5,227,896 A * | 7/1993 | Ozawa | .................. | H04N 1/195 358/471 |
| 5,515,181 A * | 5/1996 | Iyoda | ..................... | G06T 3/403 358/296 |
| 5,739,850 A * | 4/1998 | Hori | ....................... | H04N 5/232 348/231.99 |
| 7,001,024 B2 * | 2/2006 | Kitaguchi | ............. | G03B 21/26 348/135 |
| 7,046,404 B2 * | 5/2006 | Cheatle | .................... | H04N 1/04 348/211.14 |
| 2001/0053975 A1 * | 12/2001 | Kurihara | .................. | H04R 7/04 704/260 |
| 2005/0207671 A1 * | 9/2005 | Saito | .................... | G06K 9/3283 382/275 |

FOREIGN PATENT DOCUMENTS

KR 10-1997-0073059 11/1997

* cited by examiner

*Primary Examiner* — Luong T Nguyen
(74) *Attorney, Agent, or Firm* — Paratus Law Group, PLLC

(57) ABSTRACT

Disclosed are an image correction method and apparatus for a visually impaired person, which are capable of dividing, enlarging, and photographing a subject to be photographed, correcting images photographed in a divided state, and providing one image. The image correction method includes: a dividing process of dividing a subject to be photographed into at least two zones; an individual photographing process of, by an image photographing unit, photographing each of the divided zones along an arbitrarily set course; an image correcting process of correcting skewness of an image of each of the photographed zones; and an image synthesizing process of synthesizing the corrected images into one image. Thus, the image is divided, enlarged, and photographed, and the photographed images are generated into one image. Thereby, a high-resolution image is provided along with a high character recognition rate and a still image is provided with a high resolution.

13 Claims, 12 Drawing Sheets

Fig. 7

|   |   |   |
|---|---|---|
| 1 | A | 2 |
| B | H | C |
| 3 | D | 4 |
| E | I | F |
| 5 | G | 6 | great # IMAGE CORRECTION METHOD AND APPARATUS FOR VISUALLY IMPAIRED PERSON

CROSS REFERENCE TO PRIOR APPLICATIONS

The present application claims priority under 35 U.S.C. §119 to Korean Patent Application No. 10-2013-0124306 (filed on Oct. 18, 2013), which is hereby incorporated by reference in its entirety.

BACKGROUND OF THE INVENTION

1. Field of the Invention

The present invention relates, in general, to a method and apparatus for correcting an enlarged photographed image for a visually impaired person, and, more particularly, to an image correction method and apparatus for a visually impaired person, capable of dividing, enlarging, and photographing a subject to be photographed, correcting images photographed in a divided state, and providing one image.

2. Description of the Related Art

Generally, visually disabled persons or visually impaired persons are deprived of their normal vision due to various eye diseases, and have difficulty recognizing objects, if even possible, or can only recognize objects within a very short distance. Image enlarging devices are used to compensate for visually impaired persons. Image enlarging devices enlarge and show images of objects such as books, medicine bottles, receipts, etc. that are encountered in daily life.

In this regard, a real image system disclosed in Korean Unexamined Patent Application Publication No. 10-1997-0073059 (hereinafter referred to as "patent document 1") includes: an image capturing means on which a subject is put and which is configured to capture an image from the subject, to convert the captured optical image into a video signal, and to output the video signal; an image enlarging means that is removably mounted on the image capturing means, enlarges the image of the subject with a high magnification, and transmits the enlarged image to the image capturing means; and an image outputting means that receives the video signal output from the image capturing means, converts the video signal into the image, and outputs the image.

In patent document 1, the subject is captured, enlarged, and output as an image. Thereby, a visually impaired person can look at the subject on an output screen at a short distance.

However, patent document 1 simply provides a structure having a means for allowing the subject to be captured, enlarged, and output as the image. Patent document 1 provides a function as an image enlarging device, but neither a means for enhancing a resolution of the image capturing means nor a technique capable of correcting a distorted image resulting from distortion, inclination, etc. of the image. Patent document 1 should provide an image capturing means having a high resolution in order to obtain a high-resolution image and it fails to restore distortion, inclination, etc. of the image to provide an image having trapezoidal distortion.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Unexamined Patent Application Publication No. 10-1997-0073059 (published on Nov. 7, 1997, and entitled "real image system and apparatus")

SUMMARY OF THE INVENTION

Accordingly, the present invention has been made keeping in mind the above problems occurring in the related art, and the present invention is intended to propose an image correction method and apparatus for a visually impaired person, capable of dividing a sheet of a document into multiple zones, enlarging and photographing the divided zones, recognizing an inclined degree of an image of each photographed divided zone to correct skewness of the image, and synthesizing images of the divided zones into one image so as to provide a high-resolution image.

In order to achieve the above object, according to an aspect of the present invention, an image correction method for a visually impaired person includes: a dividing process of, by a control unit, dividing a subject to be photographed into at least two zones; a photographing process of, by an image photographing unit, sequentially moving to the zones to photograph the zones based on an order for photographing the zones; an image correcting process of correcting skewness of an image of each of the photographed zones; and an image synthesizing process of synthesizing the corrected images into one image.

The dividing process according to an exemplary embodiment of the present invention may include: a magnification setting process of, by a user, setting an enlargement magnification of the subject via a user interface; and a zone diving process of dividing the zone of the subject according to the set enlargement magnification.

The photographing process according to an exemplary embodiment of the present invention may include: a photographing order determining process of determining a photographing order of the divided zones; a camera angle adjusting process of adjusting an angle of a camera according to the determined order; and a photographing process of photographing the divided zones of the subject with the enlargement magnification set by the user.

The image correcting process according to an exemplary embodiment of the present invention may include: a camera angle receiving process of receiving an inclined angle of a camera; an image cutting process of cutting the image based on an inclined angle between the camera and a base; and an image restoring process of expanding the cut image to an image of a preset size.

The image synthesizing process according to an exemplary embodiment of the present invention may include: an overlapping region setting process of overlapping the divided zones to a set range to set overlapping regions to be photographed; an overlapping region identifying process of comparing pixel information values such as RGB values or YUV values on the overlapping regions to identify the overlapping regions; and an image synthesizing process of overlapping points having the same pixel information values such as RGB values or YUV values on the overlapping regions to synthesize the images. Further, the image correction method further includes, after the image synthesizing process, a character recognizing process of recognizing characters included in the generated image. The image correction method further includes, after the character recognizing process, a character-voice converting process of converting the recognized characters into a voice, and a voice outputting process of outputting the voice using at least one voice outputting means for outputting the generated voice. The voice outputting process further includes synchronizing the output voice and the recognized characters to produce a highlighting effect on the characters output to the voice.

According to another aspect of the present invention, an image correction apparatus for a visually impaired person includes: an image photographing unit photographing an image of a subject; a first motor controlling an angle of the image photographing unit in leftward and rightward directions; a second motor controlling the angle of the image photographing unit in upward and downward directions; a user interface receiving an input signal for controlling the first motor and the second motor from a user; and a control unit that controls the image photographing unit to divide the subject to be photographed into at least two zones, corrects skewness of an image of each of the zones photographed by the image photographing unit, and synthesizes the corrected images.

The control unit according to an exemplary embodiment of the present invention may receive input of the user via the user interface and divides the zones according to a magnification.

The control unit according to an exemplary embodiment of the present invention may include: a division part dividing the subject to be photographed by the image photographing unit into the at least two zones; an identification part that identifies an inclined angle of the image photographing unit according to the signal input from the user interface; an analysis part analyzing a value of a slope of the image according to the inclined angle of the image photographing unit; a correction part that cuts the image according to the slope value of the image from a reference point preset to each of the divided zones and restores the cut image to an image of a preset size; an overlapping part that overlaps the divided zones to an arbitrarily set range to set overlapping regions to be photographed, photographs the divided zones to compare pixel information values such as RGB values or YUV values on the overlapping regions of the image of each zone to identify the overlapping regions, and synthesize the images based on the identified overlapping regions; a character recognition part recognizing characters included in the generated image; a character-voice conversion part converting the recognized characters into a voice; and a voice output part outputting the voice using at least one voice outputting means for outputting the generated voice. The image photographing unit sequentially photographs the divided zones along a course preset for the control unit.

In the image correction method and apparatus for a visually impaired person according to the present invention, to allow a high-resolution image to provide a user using a low-resolution photographing means, the subject can be divided, enlarged, and photographed, and photographed images can be synthesized into one image.

Further, to enable a visually impaired person to easily recognize the image, a distorted image is corrected, and characters included in the image photographed are output to other characters and a voice which the visually impaired person can recognize by the character recognition part, the character-voice conversion part, and the voice output part. Thereby, a recognizing power of the visually impaired person is improved.

BRIEF DESCRIPTION OF THE DRAWINGS

The above and other objects, features and other advantages of the present invention will be more clearly understood from the following detailed description when taken in conjunction with the accompanying drawings, in which:

FIG. 7 is a view showing overlapping regions of images divided by a division part in accordance with the present invention;

DETAILED DESCRIPTION OF THE INVENTION

Hereinbelow, exemplary embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
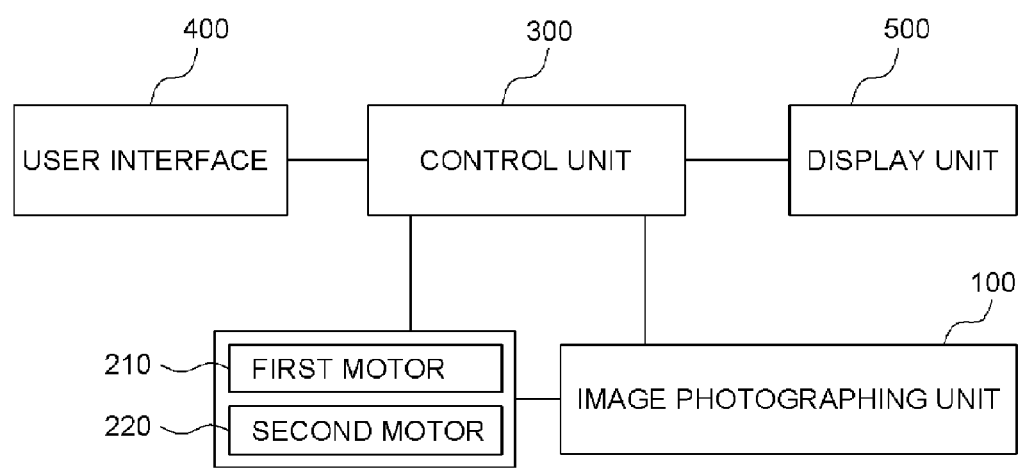
FIG. 1 is a functional block diagram showing an image correction apparatus for a visually impaired person in accordance with the present invention.
Figure 2:
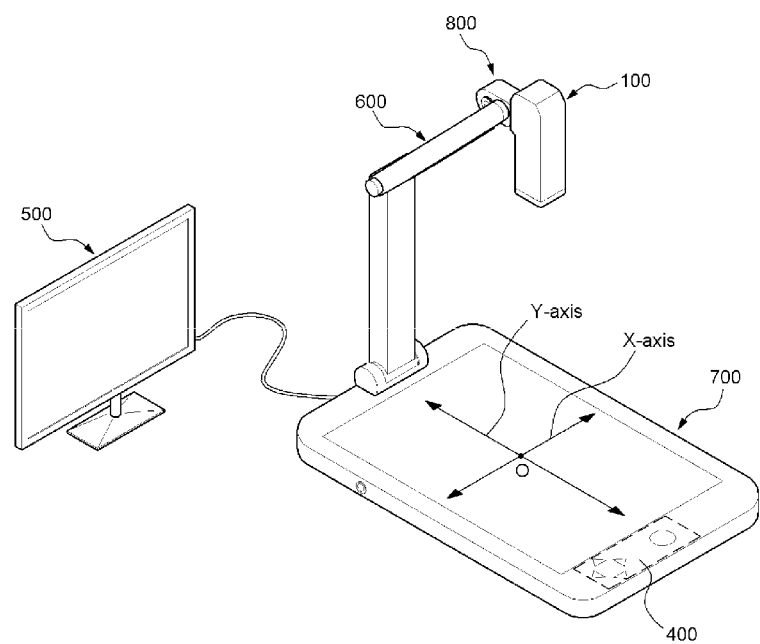
FIG. 2 is a perspective view showing an overall appearance of the image correction apparatus in accordance with the present invention.
Figure 3:
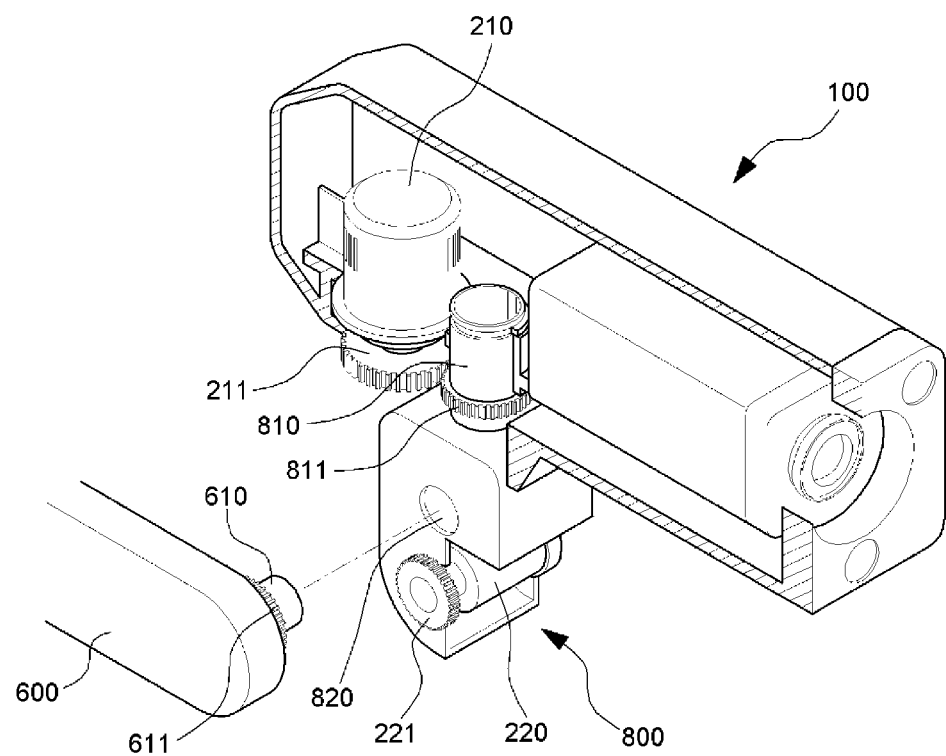
FIG. 3 is a perspective view showing an image photographing unit and first and second motors in accordance with the present invention.
Figure 4:
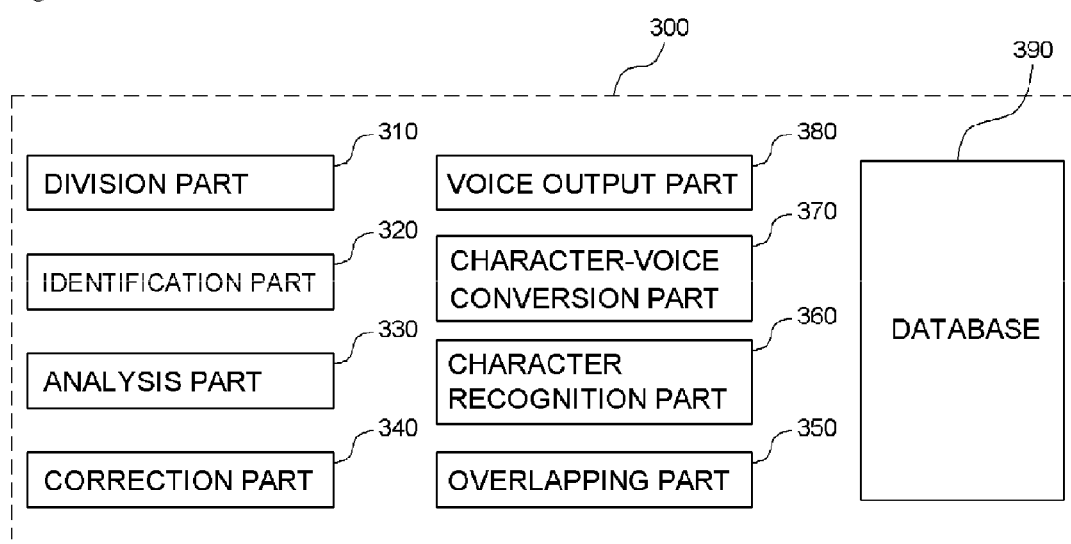
FIG. 4 is a functional block diagram showing a control unit in accordance with the present invention.
Figure 5:
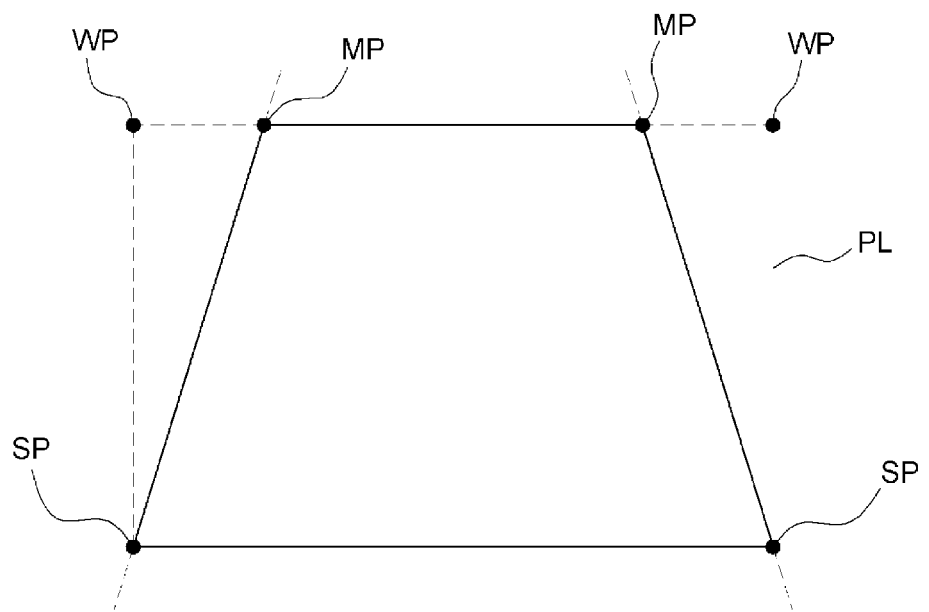
FIG. 5 shows how to correct an image using a correction part.
Figure 6:
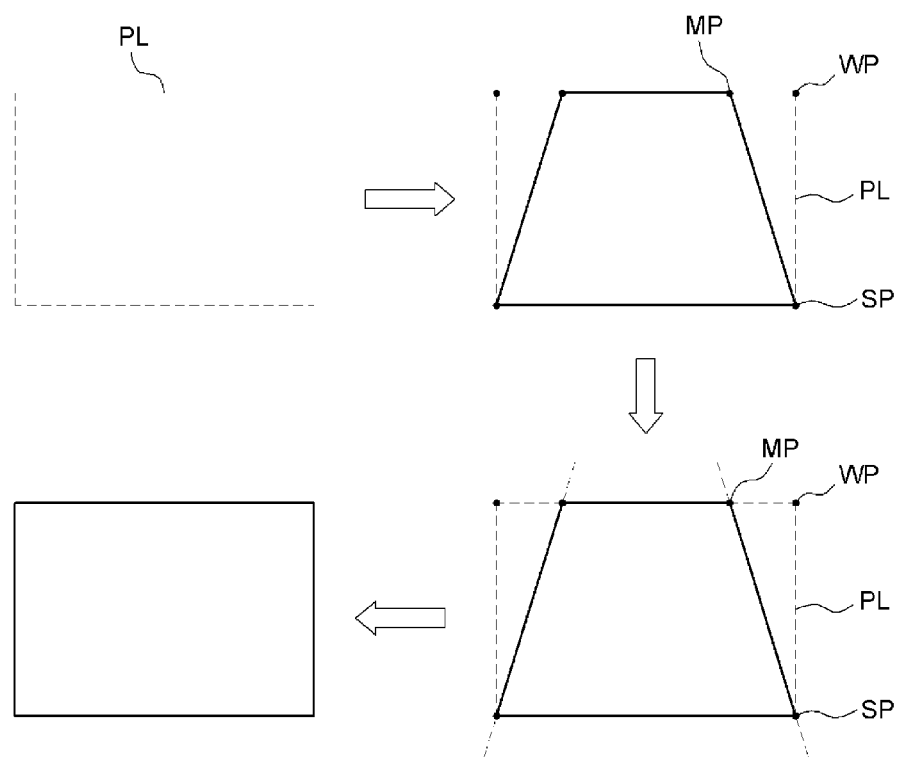
FIG. 6 is a view for describing processes of correcting a photographed image in accordance with the present invention.
Figure 7:
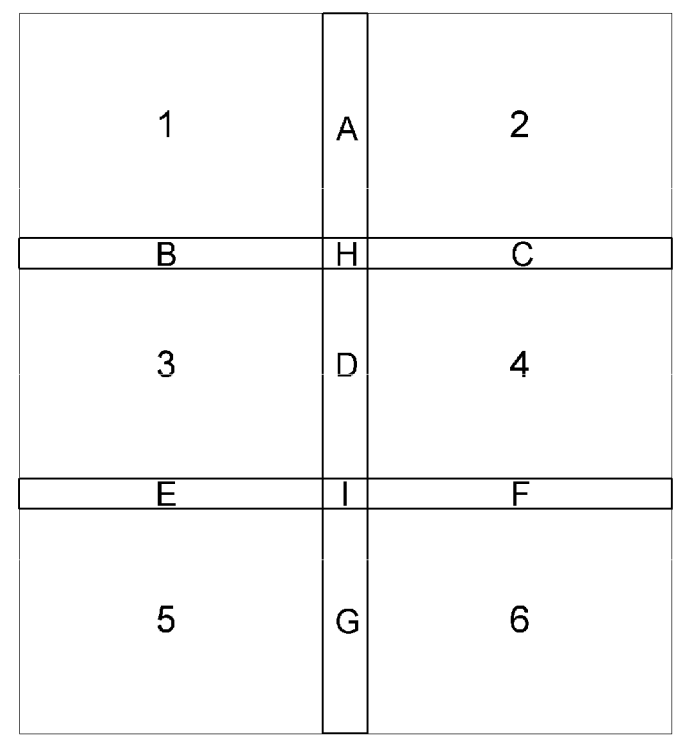

FIG. 1 is a functional block diagram showing an image correction apparatus for a visually impaired person in accordance with the present invention. FIG. 2 is a perspective view showing the image correction apparatus in accordance with the present invention. FIG. 3 is a perspective view showing an image photographing unit and motors in accordance with the present invention. FIG. 4 is a functional block diagram showing a control unit in accordance with the present invention. FIG. 5 shows how to correct an image using a correction part. FIG. 6 is a view for describing processes of correcting a photographed image in accordance with the present invention. FIG. 7 is a view showing overlapping regions of images divided by a division part in accordance with the present invention.

Referring to FIGS. 1 and 2, an image correction apparatus for a visually impaired person in accordance with the present invention includes an image photographing unit 100. The image photographing unit 100 is a unit for photographing a subject, and is provided therein with a camera or a camcorder. The image photographing unit 100 is connected to a control unit 300 in order to correct a photographed image and a display unit 500 in order to output the image corrected and synthesized by the control unit 300 to the outside. The display unit 500 may be replaced with a monitor, television (TV), or a personal computer (PC) monitor.

Referring to FIG. 2, the image correction apparatus for a visually impaired person in accordance with the present invention includes a support 600, one end of which is connected to the image photographing unit 100, and a base 700 on which the subject is put and which is connected to the other end of the support 600. The base 700 may be formed in a structure capable of supporting the support 600 and the image photographing unit 100 in view of structural stability, and preferably in a shape of a plate whose upper surface has a wide area.

Referring to FIGS. 1 and 3, a driving unit 800 is installed between the support 600 and the image photographing unit 100 and connects the support 600 and the image photographing unit 100. The driving unit 800 is provided with an insertion rod 810 protruding upward from an upper surface thereof. The image photographing unit 100 is inserted into the insertion rod 810, and can be rotated around the insertion rod 810. Further, the support 600 is provided with a rotational shaft 610 that protrudes from one side thereof and is inserted into a fastening hole 820 formed in the driving unit 800. As the rotational shaft 610 is inserted into the fastening hole 820, the driving unit 800 can be rotated around the rotational shaft 610.

Referring to FIGS. 1 and 3, the image photographing unit 100 is provided therein with a first motor 210 that can rotate the image photographing unit 100 in leftward and rightward directions. The first motor 210 includes a first gear 211 rotated by a rotating force transmitted from the first motor 210. In detail, the first gear 211 of the first motor 210 is engaged with a second gear 811 formed on an outer circumferential surface of the insertion rod 810 such that the image photographing unit 100 can be rotated around the insertion rod 810. Thus, the first motor 210 controls the image photographing unit 100 such that the image photographing unit 100 is rotated in an X-axis direction of the base 700 to be able to photograph the subject.

Referring to FIG. 3, the driving unit 800 is provided therein with a second motor 220. The second motor 220 includes a third gear 221 rotated by a rotating force transmitted from the second motor 220. The third gear 221 of the second motor 220 is engaged with a fourth gear 611 formed on an outer circumferential surface of the rotational shaft 610 so as to be able to rotate the image photographing unit 100 in upward and downward directions. Thus, the second motor 220 controls the image photographing unit 100 such that the image photographing unit 100 is rotated in a Y-axis direction of the base 700 to be able to photograph the subject. Here, the first motor 210 and the second motor 220 may employ a direct current (DC) motor, a servo-motor, or a stepper motor.

Referring to FIGS. 1 and 2, a user interface 400 may assume a type of a wired or wireless controller. An input means for inputting an input signal to the user interface 400 may include a joy stick, a button, a touch panel, a mouse, or a keyboard. When receiving the input signal from the outside (user), the user interface 400 can control the driving of the first motor 210 and the second motor 220.

Meanwhile, when the user interface 400 has a cross-layer structure along with the display unit 500, the display unit 500 may be implemented as a touch screen.

Referring to FIG. 1, the control unit 300 controls the driving of the first motor 210 and the second motor 220. The control unit 300 may be formed in the support 600 or the base 700. The control unit 300 is connected to the image photographing unit 100, divides the subject to be photographed by the image photographing unit 100 into at least two zones, corrects skewness of the photographed images, synthesizes the corrected images, and transmits the synthesized image.

Referring to FIG. 4, the control unit 300 includes a division part 310. The division part 310 may divide the subject to be photographed by the image photographing unit 100 into at least two virtual zones. In detail, the division part 310 may divide and enlarge a zone of the subject to be photographed by the image photographing unit 100 according to a magnification set by a user.

For example, the zone of the subject to be photographed is virtually divided into two zones in the case of a magnification of 2×, or four zones in the case of a magnification of 4×. When the virtual division of the zone is completed, the divided zones are sequentially photographed by the image photographing unit 100. Here, the image photographing unit 100 can enlarge and photograph each of the divided zones according to the set magnification. If a magnification of 1× is used to contain the subject to be photographed by the image photographing unit 100 within one screen, one of the four divided zones is photographed with the magnification of 4×. In this way, the image photographing unit 100 enlarges and photographs each of the divided zones and synthesizes the photograph zones into one image. Thereby, the subject having the same area is photographed with a higher resolution than when photographed with the magnification of 1×. Thus, it is possible to secure an image having a higher resolution.

Referring to FIGS. 2 and 7, assuming that the image photographing unit 100 photographs each of six divided zones, the control unit 300 presets a motion path along which the image photographing unit 100 moves, and transmits a signal for the preset motion path to the first motor 210 and the second motor 220. Here, the preset motion path may have various paths such as a path along which the image photographing unit 100 can photograph the first to sixth zones one column by one column, or a path along which the image photographing unit 100 can photograph the first to sixth zones in a zigzag pattern.

For example, when the user interface 400 transmits a signal for photographing an image of the first zone among the six divided zones to the control unit 300, the control unit 300 extracts a preset signal (execution information) corresponding to the signal transmitted from the user interface 400 and transmits the extracted signal to the first motor 210 and the second motor 220. Afterwards, the first motor 210 and the second motor 220 rotate at an angle designated according to the preset motion path, and the first zone can be photographed.

Referring to FIGS. 2 and 4, the control unit 300 includes an identification part 320. The identification part 320 receives the input signal from the user interface 400. When the image photographing unit 100 is rotated by the driving of the first motor 210 and the second motor 220, the identification part 320 analyzes a value of an inclined slope of the image photographing unit 100. The identification part 320 can identify an inclined angle of the image photographing unit 100 with reference of the input signal from the user interface 300 or a rotational angle of each of the first motor 210 and the second motor 220.

Referring to FIGS. 2 and 7, assuming that the image photographing unit 100 photographs a central point O of the base 700 which is a point of intersection of X and Y axes, when the control unit 300 receives a signal indicating that the first zone is photographed from the user interface 400, the control unit 300 rotates the first gear 211 of the first motor 210 in a leftward direction at an angle of 10°, and the third gear of the second motor 220 in an upward direction at an angle of 10°. Afterwards, the control unit 300 transmits the rotation values of the first and second motors 210 and 220 to the identification part 320. The identification part 320 receives the rotation values of the first and second motors 210 and 220, and can identify the inclined angle of the image photographing unit 100.

Referring to FIGS. 4 and 7, an analysis part 330 analyzes a slope value of an image of the first zone photographed by the image photographing unit 100. Since the subject is photographed while the image photographing unit 100 is inclined, the photographed image corresponds to the inclined angle of the image photographing unit 100 which is identified by the identification part 320. Here, the slope value of the image may be regarded as a data value including an output shape and size of the image photographed by the image photographing unit 100. Thus, the analysis part 330 can analyze the shape and size of the image to be output using information on the inclined angle of the image photographing unit 100 which is collected by the identification part 320.

Referring to FIGS. 4 and 5, the control unit 300 includes a correction part 340 that corrects the photographed image on the basis of the slope value analyzed by the analysis part 330. The image photographed in the state in which the image photographing unit 100 is inclined has a trapezoidal shape. The trapezoidal shape of the photographed image shows an angle made with the base 700 like the slope value of the image which is analyzed by the analysis part 330. Here, to correct the photographed image, virtual lines and points controlled by the correction part 340 are added to the photographed image. Such virtual lines and points include an image output line PL indicating an area which an image based on virtual reference points SP has when output to the display unit 500 as a reference image, motion points MP determined by the slope value of the image, and expansion points WP to which the motion points MP are shifted.

An image correction method using the correction part 340 will be described with reference to FIG. 6. The correction part 340 sets the image output line PL, and outputs the image photographed by the image photographing unit 100 on the image output line PL. Then, the correction part 340 generates the reference points SP, the motion points MP, and the expansion points WP. Here, portions of the image which are located outside virtual straight lines connecting the reference points SP and the motion points MP are cut and deleted. When the cutting of the portions of the image is completed, the motion points MP are shifted to the expansion points WP. Thereby, the cut image can be output as an image having a preset size.

In this way, the correction part 340 corrects the image using projective transform, and shifts the motion points MP to the expansion points WP using an interpolation method such as bilinear, bicubic, or lanczos. Thereby, image information can be regenerated. Thus, even when the subject is photographed in an inclined state (in a trapezoidal shape) by the image photographing unit 100, the image can be output to the display unit 500 without an inclination.

Referring to FIG. 4, the control unit 300 includes an overlapping part 350. The overlapping part 350 overlaps the divided images to generate one image.

Referring to FIG. 7, it is assumed that the subject to be photographed is divided into first to sixth zones. Here, each zone has an overlapping region that partially overlaps with the neighboring zone. The overlapping regions include an overlapping region A on which the first and second zones overlap with each other, an overlapping region B on which the first and third zones overlap with each other, an overlapping region C on which the second and fourth zones overlap with each other, an overlapping region D on which the third and fourth zones overlap with each other, an overlapping region E on which the third and fifth zones overlap with each other, an overlapping region F on which the fourth and sixth zones overlap with each other, and an overlapping region G on which the fifth and sixth zones overlap with each other. Here, the overlapping regions may be set to an arbitrary range by a user.

When the overlapping regions are set by the user, the image photographing unit 100 photographs each of the divided zones as well as the overlapping regions belonging to each zone. For example, when the image photographing unit 100 photographs the first zone, the overlapping regions A and B are photographed together. Thus, when the overlapping regions of the photographed first to sixth zones are combined, divided images can be made into one image.

Further, the overlapping part 350 can identify the overlapping regions by comparison of pixel information values using RGB values, YUV values, etc. on the overlapping regions. For example, the overlapping region A belonging to the first zone overlaps with the overlapping region A belonging to the second zone, and then the pixel information values using RGB values, YUV values, etc. are compared on the overlapping region A. Here, the overlapping part 350 adjusts the first zone and the second zone such that the overlapping region A belonging to the first zone and the overlapping region A belonging to the second zone are matched with each other by the comparison of the pixel information values using RGB values, YUV values, etc. on the overlapping regions. Thus, images divided at the same point can be generated into one image without an error.

Further, the overlapping regions include an overlapping region H on which the first to fourth zones overlap, and an overlapping region I on which the third to sixth zones overlap. Here, the overlapping part 350 checks whether the pixel information values using RGB values, YUV values, etc. are matched on the overlapping regions H of the first to fourth zones. This can reduce the processing time because the first to fourth zones can overlap without an error.

Referring to FIG. 4, the control unit 300 includes a database 390. The database 390 stores information which the control unit 300 should execute according to each signal received from the user interface. Thus, when an input signal is received from the user interface 400, the control unit 300 can transmit information that is stored in the database 390 and corresponds to the input signal to the first motor 210 and the second motor 220.

Referring to FIG. 4, the control unit 300 includes a character recognition part 360 that recognizes characters included in the generated image. When the image photographing unit 100 divides the subject into multiple zones, and enlarges and photographs the divided zones, the photographed images have a high resolution. As such, a character recognition rate of the character recognition part 360 can be increased. Therefore, the character recognition rate can be increased at the image photographing unit 100 supporting a low resolution. To recognize the image, the character recognition part 360 may employ an optical character reader (OCR).

Referring to FIG. 4, the control unit 300 includes a character-voice conversion part 370 and a voice output part 380. The character-voice conversion part 370 for converting the characters recognized by the character recognition part 360 into a voice and the voice output part 380 for outputting voice data outputs the voice using at least one voice outputting means. Here, the voice outputting means preferably employs a speaker. Further, the character-voice conversion part 370 uses character voice automatic conversion technology such as text to speech (TTS) technology to output the recognized characters to the voice. A highlighting effect can be produced on the characters output to the voice by synchronization of the output voice and the recognized characters.

Figure 8:
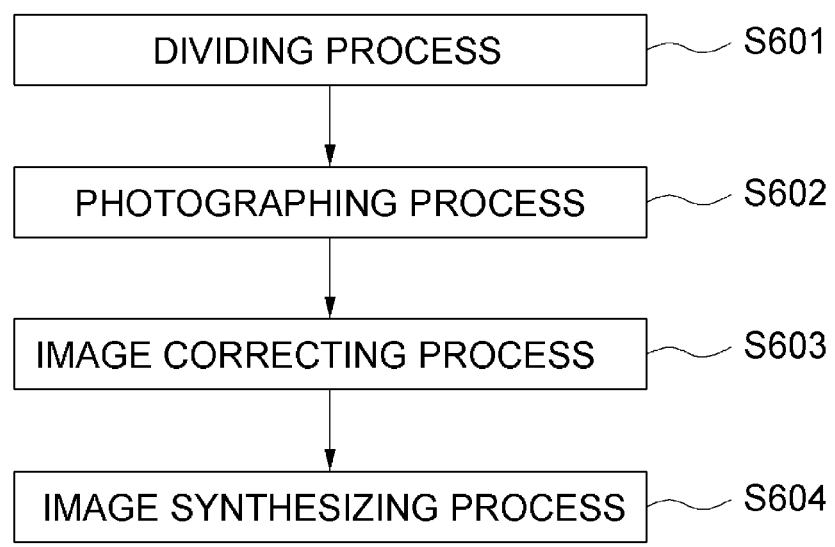
FIG. 8 is a flow chart showing an image correction method for a visually impaired person in accordance with the present invention.
Figure 9:
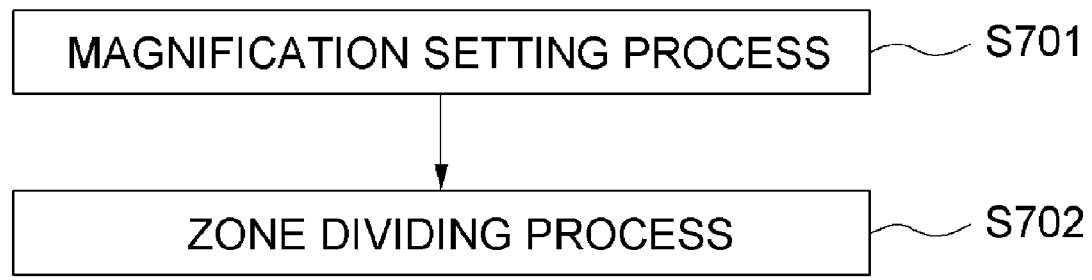
FIG. 9 is a flow chart for describing a dividing process in accordance with the present invention.
Figure 10:
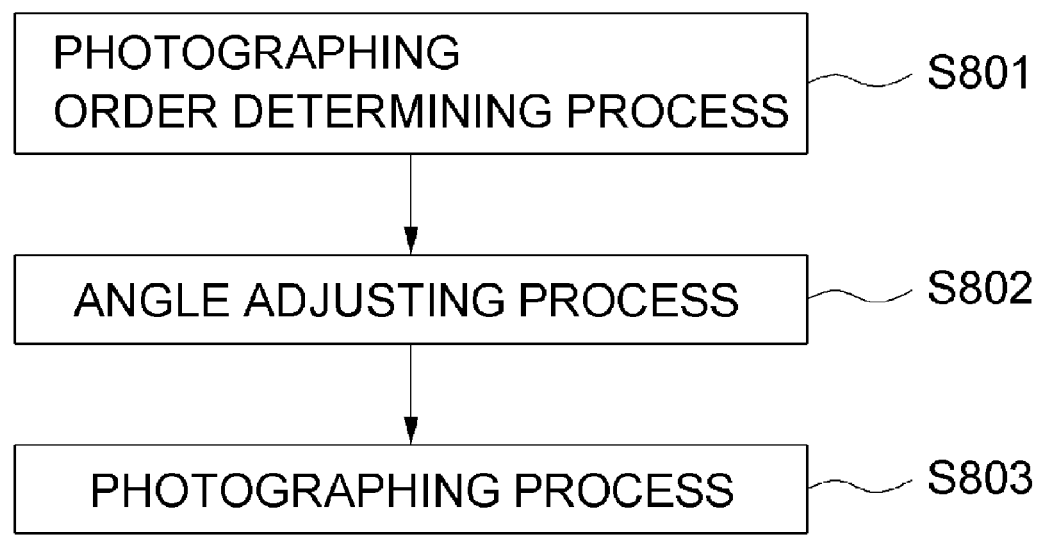
FIG. 10 is a flow chart for describing a photographing process in accordance with the present invention.
Figure 11:
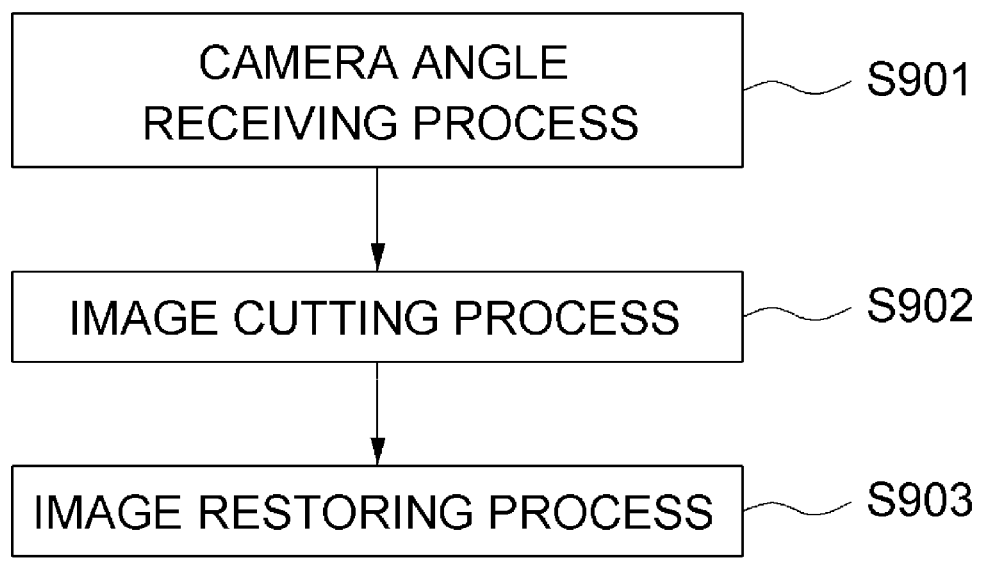
FIG. 11 is a flow chart for describing an image correcting process in accordance with the present invention.
Figure 12:
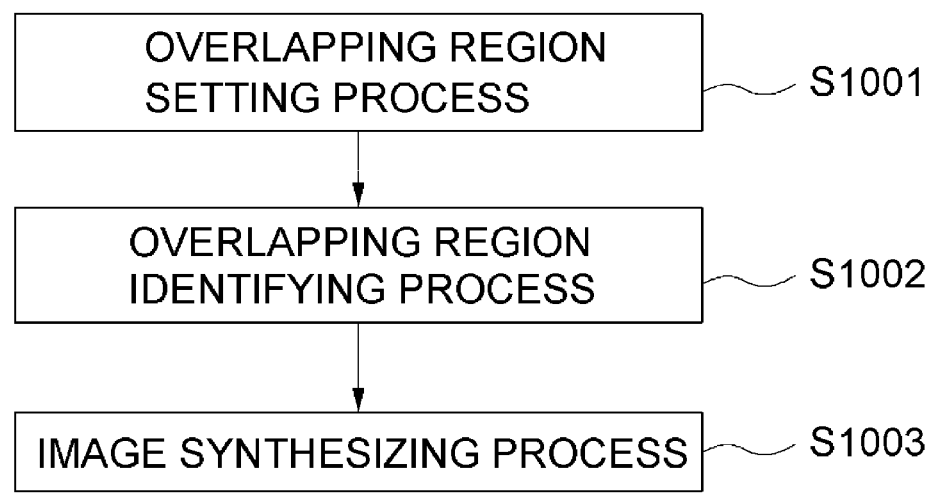
FIG. 12 is a flow chart for describing an image synthesizing process in accordance with the present invention.

An image correction method for a visually impaired person according to an exemplary embodiment of the present invention will be described with reference to FIGS. 8 to 12. FIG. 8 is a flow chart showing an image correction method for a visually impaired person in accordance with the present invention. FIG. 9 is a flow chart for describing a dividing process in accordance with the present invention. FIG. 10 is a flow chart for describing a photographing process in accordance with the present invention. FIG. 11 is a flow chart for describing an image correcting process in accordance with the present invention. FIG. 12 is a flow chart for describing an image synthesizing process in accordance with the present invention.

Referring to FIG. 8, a subject to be photographed is divided into at least two zones (S601). Thus, the image photographing unit 100 divides the subject to be photographed into at least two preset zones. The zones are set to multiple zones such as six zones, eight zones, or the like by a user.

The image photographing unit 100 sequentially enlarges and photographs each of the divided zones along an arbitrarily set course (S602). To sequentially photograph each of the divided zones, the image photographing unit 100 photographs each of the divided zones along a course preset by the control unit 300.

The enlarged and photographed images show trapezoidal distortion. To correct the distortion, a slope of each image is analyzed through a slope of a camera when each image is photographed, and the trapezoidal distortion of each image is corrected on the basis of the analyzed slope (S603).

The corrected images are synthesized into one image (S604). Thus, a high-resolution image can be acquired despite the use of a low-resolution photographing means.

Hereinafter, each process will be described with reference to FIGS. 9 to 12.

Referring to FIG. 9, a process of dividing the photographing zone of the subject includes a process of setting an enlargement magnification of the subject via the user interface 400 by a user (S701), and a process of dividing the photographing zone of the subject according to the set enlargement magnification (S702). For example, when the user sets a magnification of 4×, the photographing zone of the subject is divided into four zones.

Referring to FIG. 10, a process of photographing the subject includes a process of determining a photographing order of the divided zones (S801), a process of adjusting an angle of the camera according to the determined photographing order (S802), and a process of photographing the divided zones of the subject with the enlargement magnification set by the user to acquire images of the divided zones (S803).

Referring to FIG. 11, a process of correcting the image of each of the divided zones which is obtained by photographing includes a process of receiving information on the angle of the camera when each of the divided zones is photographed (S901), a process of acquiring information on a slope of the image on the basis of the received information on the slope and angle of the camera and cutting the image on the basis of the information on the slope of the acquired image (S902), and a process of expanding the cut image to an image of a preset size and restoring the image to an image of a reference size (S903).

Referring to FIG. 12, a process of synthesizing each of the corrected divided images includes a process of overlapping the divided zones to an arbitrarily set range and setting overlapping regions to be photographed (S1001), a process of comparing pixel information values using RGB values, YUV values, etc. on the overlapping regions and identifying the overlapping regions (S1002), and a process of overlapping points having the same pixel information values using RGB values, YUV values, etc. on the overlapping regions to synthesize the images (S1003).

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An image correction method for a visually impaired person comprising:
   a dividing process of dividing a subject to be photographed into at least two zones;
   a photographing process of, by an image photographing unit, photographing each of the at least two divided zones;
   an image correcting process of correcting skewness of an image of each of the at least two photographed zones; and
   an image synthesizing process of synthesizing the corrected images of the at least two photographed zones into a single image,
   wherein the image synthesizing process includes:
   an overlapping region setting process of overlapping the at least two divided zones to a set range to set overlapping regions to be photographed;
   an overlapping region identifying process of comparing pixel information values on the overlapping regions to identify the overlapping regions; and
   an image synthesizing process of overlapping points having the same pixel information values on the overlapping regions to synthesize the corrected images into the single image.

2. The image correction method according to claim 1, wherein the dividing process includes:
   a magnification setting process of, by a user, setting an enlargement magnification of the subject; and
   a zone diving process of dividing a zone of the subject according to the set enlargement magnification.

3. The image correction method according to claim 1, wherein the photographing process includes:
   a photographing order determining process of determining a photographing order of the at least two divided zones;
   a camera angle adjusting process of adjusting an angle of a camera according to a determined order; and
   a photographing process of photographing the at least two divided zones of the subject with the enlargement magnification set by the user.

4. The image correction method according to claim 1, wherein the image correcting process includes:
   a camera angle receiving process of receiving an inclined angle of a camera;
   an image cutting process of cutting the image of each of the photographed zones based on the inclined angle of the camera; and
   an image restoring process of expanding the cut image to an image of a preset size.

5. The image correction method according to claim 1, wherein the pixel information values are RGB values or YUV values.

6. The image correction method according to claim 1, further comprising, after the image synthesizing process, a character recognizing process of recognizing characters included in the single image synthesized by the image synthesizing process.

7. The image correction method according to claim 6, further comprising, after the character recognizing process, a character-voice converting process of converting the recognized characters into a voice, and a voice outputting process of outputting the voice.

8. The image correction method according to claim 7, wherein the voice outputting process further includes synchronizing the output voice and the recognized characters to produce a highlighting effect on the characters output to the voice.

9. An image correction apparatus for a visually impaired person comprising:
- an image photographing unit photographing an image of a subject;
- a control unit that controls the image photographing unit to divide the subject to be photographed into at least two zones, corrects skewness of an image of each of the at least two zones photographed by the image photographing unit, and synthesizes the corrected images of the at least two zones into a single image, wherein the control unit includes:
- a division part dividing the subject to be photographed by the image photographing unit into the at least two zones; and
- an overlapping part that overlaps the at least two divided zones to an arbitrarily set range to set overlapping regions to be photographed, compares pixel information values on the overlapping regions to identify the overlapping regions, and overlaps points having the same pixel information values on the overlapping regions to synthesize the corrected images into the single image, wherein the image photographing unit sequentially photographs the at least two divided zones along a course set for the control unit.

10. The image correction apparatus according to claim 9, further comprising:
- a first motor connected to the image photographing unit and rotating the image photographing unit in leftward and rightward directions;
- a second motor connected to the image photographing unit and rotating the image photographing unit in upward and downward directions; and
- a user interface receiving an input signal from a user to control rotational angles at which the first motor and the second motor rotate; and wherein the control unit further includes:
- an identification part that receives the input signal from the user interface and analyzes a value of a slope of the image photographing unit when the image photographing unit is rotated by the first motor and the second motor;
- an analysis part analyzing a value of a slope of the image according to an inclined angle of the image photographing unit; and
- a correction part that cuts an image of each of the at least two divided zones according to the slope value of the image and restores the cut image to an image of a preset size.

11. The image correction apparatus according to claim 10, wherein the pixel information values are RGB values or YUV values.

12. The image correction apparatus according to claim 10, wherein the control unit further includes a character recognition part recognizing characters included in the single image synthesized by the overlapping part.

13. The image correction apparatus according to claim 12, wherein the control unit further includes a character-voice conversion part converting the recognized characters into a voice, and a voice output part outputting the voice.

* * * * *